United States Patent [19]

Stevens

[11] B 3,927,172

[45] Dec. 16, 1975

[54] METHOD OF CONCENTRATING GALLIUM

[75] Inventor: Harry M. Stevens, Ballwin, Mo.

[73] Assignee: Monsanto Company, St. Louis, Mo.

[22] Filed: Feb. 20, 1973

[21] Appl. No.: 333,928

[44] Published under the Trial Voluntary Protest Program on January 28, 1975 as document no. B 333,928.

[52] U.S. Cl. ................ 423/129; 423/115; 423/122; 423/131; 423/135
[51] Int. Cl.$^2$ .......................................... C01G 15/00
[58] Field of Search ............ 423/131, 115, 122, 129

[56] References Cited
UNITED STATES PATENTS

| | | | |
|---|---|---|---|
| 2,582,376 | 1/1952 | Frary .............................. | 423/122 X |
| 2,582,377 | 1/1952 | Brown............................. | 423/129 X |
| 2,582,378 | 1/1952 | Brown............................. | 423/129 X |

OTHER PUBLICATIONS

Sheka, "The Chemistry of Gallium," 1966, pp. 223–225.

Waters et al., "Bureau of Mines, Report of Investigations 6940," Apr., 1967, pp. 5–9, 30–33.

*Primary Examiner*—Herbert T. Carter
*Attorney, Agent, or Firm*—J. E. Maurer; N. E. Willis; T. N. Wallin

[57] ABSTRACT

It was found that the gallium in phosphorus furnace treater dusts can be concentrated by contacting the treater dust with a slurry of an alkaline earth compound, such as calcium hydroxide, and separating the solubilized gallium from solution. The gallium can be further concentrated by contacting the gallium-containing solution with carbon dioxide to provide a gallium-containing precipitate. Alternatively, the gallium can be concentrated using other methods.

5 Claims, No Drawings

METHOD OF CONCENTRATING GALLIUM

BACKGROUND OF THE INVENTION

1. Field of the Invention

This invention relates to a method of concentrating gallium, and more particularly relates to a method for concentrating gallium from treater dusts from the electric furnace production of phosphorus.

Because of its low melting point and lack of toxicity, gallium has been used in many diverse applications. It has been used instead of mercury in dental alloys, and used as a heat transfer medium. Gallium has found limited use as the thermometric fluid for high temperature thermometers. Recently, however, high purity gallium has been alloyed with phosphorus or arsenic to form gallium phosphide or gallium arsenide, which have found extensive use in the electronics industry.

No ore is known with any appreciable concentration of gallium. The element is very widely distributed, particularly in aluminous materials where the gallium content is roughly proportional to the aluminum content. Gallium is found in small concentrations in most zinc blends, and in germanite where it appears with the mixed sulfides.

Because of the variety of minerals in which gallium occurs, many processes have been developed to obtain appreciable concentrations of the element. The concentration of gallium from germanite, the richest natural source of gallium, involves the conversion of the germanium and gallium to the chloride, and the more volatile germanium tetrachloride is separated by distillation while the gallium is recovered by electrolysis.

Gallium is also recovered from the alumina purification processes of the aluminum industry. In the Bayer process, aluminum trihydrate is crystallized from a solution of a sodium aluminate by cooling and seeding. In this process, gallium accumulates in the liquor. After concentration of the liquor and an adjustment of the pH, the gallium is separated by electrolysis. On the other hand, U.S. Pat. No. 2,582,376 discloses a process to remove gallium from alkaline solutions containing dissolved alkali metal aluminate and gallium by adding a soluble calcium compound which results in the precipitation of calcium aluminate while leaving the gallium in the solution. The gallium can then be precipitated and the precipitate redissolved in a solvent to provide a concentrated solution of gallium. Metallic gallium can then be recovered by electrolysis.

Gallium has also been found in trace quantities in phosphorus furnace treater dusts. During the production of elemental phosphorus, phosphorus vapor and carbon monoxide leave the electric furnaces carrying appreciable quantities of dust that are rich in potassium oxide, fluorine, silica, lime and lesser amounts of coke dust, slag particles and phosphate burden. To separate this dust from the elemental phosphorus, many commercial phosphorus manufacturers use hot electrostatic precipitators. The dust, variously called "precipitator dust," "collector dust" or "treater dust," is collected in the bottom of the electrostatic precipitator. The dust is removed from the bottom of the electrostatic precipitator by a screw conveyor to insure an airtight system. After removal from the electrostatic precipitator, however, the dust tends to lump or agglomerate.

Although some treater dusts from electric furnace operations contain as much as 450 parts per million by weight gallium, this concentration of gallium is not sufficiently high to be recovered directly by commercial processes. Attempts to separate the gallium from the treater dusts by dissolving the gallium in alkali solutions, such as sodium or potassium hydroxide solutions, were not satisfactory because of the presence of soluble phosphorus compounds and other materials that interferred with with separation. However, it has been found that by using the process of the present invention, the economic recovery of gallium is possible.

SUMMARY OF THE INVENTION

It is an object of this invention to provide a process to concentrate gallium. It is another object of this invention to provide a process to concentrate gallium contained in phosphorus furnace treater dusts.

These and other objects are achieved by a method of concentrating gallium in phosphorus furnace treater dusts comprising contacting the treater dust with a slurry of an alkaline earth compound, and separating the gallium from solution.

Broadly described, treater dusts from phosphorus electric furnace operations are comminuted to a small particle size, and the comminuted dusts are contacted with an aqueous slurry of an alkaline earth compound, the solution having a pH of greater than 11. The solids are separated from alkaline liquid containing the gallium. The gallium is then recovered from the liquid by means known to the art.

Any number of alkaline earth compounds can be used in the process of the present invention. By alkaline earth compounds is meant those compounds of group IIA of the periodic table of the elements that are partially soluble in water, that will provide a solution having a pH of 11 or greater when admixed with water, and that will not prevent gallium from dissolving in alkaline solution. Calcium oxides, hydrous oxides and hydroxides, such as calcium oxide, calx, quicklime, burnt lime, fat lime, slaked lime, unslaked lime and the like are satisfactory. Alkaline earth compounds such as calcium phosphates would not be satisfactory, although their presence would not be harmful.

To concentrate the gallium in electric furnace treater dusts it is necessary to comminute lumps or aggregates of treater dusts. The lumps or aggregates can be comminuted by any number of means well known to those skilled in the art, such as by grinding, grating, milling, pounding, crushing, etc. The size of the comminuted treater dust is not important, provided that the comminuted dusts will slurry with water. It has been found that passing the lumps through a hammermill until the dusts pass a 40 mesh U.S. standard sieve will provide a dust that can be readily slurried with water.

The comminuted treater dusts are then contacted with an aqueous slurry of an alkaline earth compound, the water suspending the treater dusts and the alkaline earth compound having a pH of 11 or greater. The treater dusts and the alkaline earth compound can be simultaneously slurried with water, or the treater dust can be contacted with a slurry of alkaline earth compound. However, satisfactory results have been obtained when the treater dust is slurried with water, and thereafter, an alkaline earth compound is added to the treater dust slurry.

The amount of water in the slurry is not critical, provided that there is sufficient water to avoid the formation of an excessively viscous mass. Satisfactory results have been obtained using from about 1 to about 5 grams of water per gram of treater dust, and about 1.5 grams of water per gram of dust is preferred. The slurry is agitated, such as by stirring, to prevent the dust and alkaline earth compound from settling and maintain the solids in suspension.

The slurry of treater dust and alkaline earth compound must contain sufficient alkaline earth compound to provide a pH of greater than pH 11, and preferably, to a pH of 12 or more. As will occur to those skilled in the art, the pH of the solution can be measured conveniently by a pH meter. Generally, from 0.1 to 1 gram of alkaline earth compound per gram of dust is sufficient. Although any number of alkaline earth compounds are satisfactory, calcium hydroxide is preferred, and when calcium hydroxide is used, about 0.3 gram of calcium hydroxide per gram of dust is preferred.

The slurry containing the alkaline earth compound is then agitated for a sufficient time to permit the amphoteric gallium to become dissolved in the basic solution. It is preferred to heat the slurry to hasten the gallium solubility but the slurry need not be heated to boiling. Maintaining the slurry at between about 90°C. and about 99°C., preferably at about 95°C., for 15 minutes to 240 minutes, preferably for 60 minutes to 120 minutes, is sufficient.

After the slurry has been agitated for a sufficient time to permit the gallium to dissolve, agitation is discontinued, and the solids are separated from the liquid. Any number of means can be used to separate the solids from the liquid, as will occur to those skilled in the art, such as settling and decantation, filtration, centrifugation, etc.

After the solids have been separated from the liquid containing the gallium, the gallium is then recovered from solution. The gallium in the liquid can be concentrated by evaporating the water, or more preferably, by precipitating the gallium from solution and subsequent treatment of the precipitate to recover the gallium.

In a preferred embodiment of this invention, the liquid containing the gallium is treated with carbon dioxide until a gallium-containing precipitate forms. It is preferable to treat the liquid with carbon dioxide until the pH of the solution reaches about pH 8 to about pH 8.5. The gallium in the precipitate formed from the carbon dioxide treatments can be recovered by methods known to the art, such as by treating the dried precipitate with anhydrous hydrogen chloride to volatilize the gallium as gallium trichloride.

In another preferred embodiment, the liquid containing the gallium is treated with hydrogen sulfide at a pH of about 10.5 to about 11.5 to form a predominate zinc sulfide precipitate which also contains gallium. Thereafter, the sulfide precipitate is separated from the liquid, such as by settling and decantation, or by filtration, and thereafter the sulfide precipitate is treated with a mineral acid, such as sulfuric acid, to dissolve the sulfide precipitate. Then, the acid-treated solution is heated to drive off the hydrogen sulfide, and then treated with ammonia to a pH between about 4 and about 7, preferably to a pH of about 6, to provide an ammonical precipitate. The solids are then separated from the liquid, such as by filtration, settling and decantation. The solids then consist of a hydroxide precipitate containing a high concentration of gallium. The gallium in the precipitate can then be recovered by methods known to the art.

DESCRIPTION OF THE PREFERRED EMBODIMENT

This invention is illustrated by but not limited to the following examples.

EXAMPLE I

To 100 grams of treater dust containing 204 micrograms of gallium per gram of dust was added 150 milliliters of water to form a slurry and the slurry was then heated with agitation to about 80°C. Then, about 30 grams of calcium hydroxide were added to the slurry. The limed slurry was agitated at between 80° and 100°C. for about 45 minutes. Thereafter, the solids were separated from the liquid in the slurry by filtration. The residue was washed with several portions of water and analysis revealed that the residue weighing 99.8 grams (dry basis) contained 122 micrograms of gallium per gram of residue. The filtrate which amounted to 260 milliliters contained 46.8 micrograms of gallium per milliliter.

The liquor was then carbonated with about 17 to about 30 milliliters (at standard temperature and pressure) of carbon dioxide per milliliter of liquor, or until the pH of the solution reached a pH of about 8 to 8.5. The solids were separated from the liquid by filtration. The carbonated filtrate was maintained at room temperatures for 24 hours and any precipitate was then separated from the liquid by filtration and dried at 140°C. The solids and liquids were then analyzed. The solution contained about 0.2 micrograms of gallium per milliliter and the solid contained about 1.3 weight percent gallium (as gallium metal).

Thus, it can be seen that one embodiment of this invention for concentrating gallium in phosphorus furnace treater dust comprises contacting the treater dust with an alkaline slurry of alkaline earth compounds, separating the gallium-containing solution from any remaining solids, and carbonating the gallium-containing solution to form a gallium containing precipitate, and separating the precipitate from the solution.

EXAMPLE II

To 100 grams of phosphorus furnace treater dust containing 450 micrograms of gallium per gram of dust was added about 150 milliliters of water to form a slurry. The slurry was then heated to about 95°C. with agitation and then about 30 grams of calcium hydroxide was added to the heated slurry. The solids were separated from the liquid by filtration, and the solids were then washed with water. A 100 milliliter aliquot of the solution containing 130 micrograms gallium per milliliter of liquid was then treated with hydrogen sulfide and the precipitate thus formed was separated from solution by filtration. The precipitate was then treated with sulfuric acid and heated to boiling to drive off the hydrogen sulfide. Then, the acid solution was treated with ammonium hydroxide to a pH between 4 and 7, preferably about 6, to form a second precipitate which was then separated from solution by filtration. The precipitate was dissolved in sulfuric acid and precipitated with ammonium hydroxide two more times. The final precipitate weighed 0.032 grams (on a dry basis) and contained approximately 26 percent gallium (as the metal).

EXAMPLE III

To 100 grams of treater dust containing 410 micrograms of gallium per gram of dust was added about 305 milliliters of water of form a slurry and the slurry was heated with agitation to about 95°C. Then, about 30 grams of calcium hydroxide were added to the slurry, and the limed slurry at about 95°C. was agitated for about 60 minutes. Thereafter, the procedure of Example I was followed. The gallium-containing precipitate contained about 0.9 weight percent gallium (as gallium metal).

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. As an example, gallium can be recovered from solution using ion exchange techniques, or alternatively, the gallium in precipitates can be recovered by dissolving the gallium and recovering the gallium by ion exchange techniques. Accordingly, modifications are contemplated which can be made without departing from the spirit of the described invention.

What is claimed is:

1. A method of concentrating gallium from phosphorus furnace treater dust comprising:
   A. contacting the treater dust with an aqueous slurry of an alkaline earth compound, the solution having a pH of greater than 11;
   B. separating the alkaline liquid containing the gallium from the treater dust; and
   C. recovering the gallium from the liquid.

2. A method of claim 1 wherein the alkaline earth compound is selected from the group consisting of calcium oxide, hydrous calcium oxide and calcium hydroxide.

3. A method of claim 1 wherein the alkaline earth compound is calcium hydroxide.

4. A method of claim 1 wherein the gallium is concentrated by carbonating the alkaline liquid containing the gallium to form a gallium-containing precipitate, and separating the gallium-containing precipitate from solution.

5. A method of claim 1 wherein the gallium is concentrated by treating the alkaline liquid containing the gallium with hydrogen sulfide to form a gallium-containing precipitate, separating the precipitate from solution, treating the precipitate with acid, heating the acid containing precipitate to drive off hydrogen sulfide, neutralizing the acid solution to form a second gallium-containing precipitate, and separating the second gallium-containing precipitate from solution.

* * * * *